June 18, 1963  J. R. LEMYRE ET AL  3,093,897
METALLURGY
Filed March 13, 1959
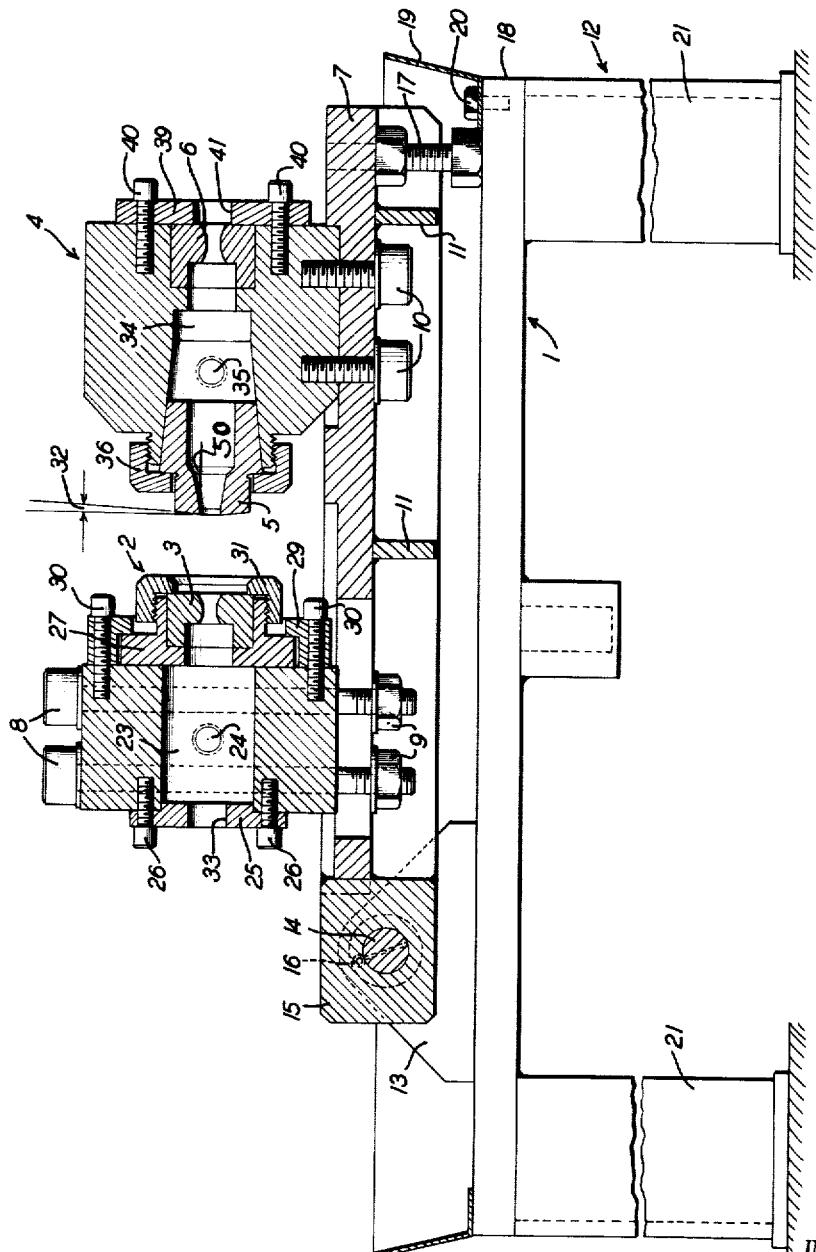
INVENTORS
Joseph R. Lemyre
Ordeen L. Burtenshaw
John A. Ketchum
BY
ATTORNEY though a cleaning die.

3,093,897
METALLURGY

Joseph R. Lemyre, Ordeen L. Burtenshaw, and John A. Ketchum, all of Newark, Ohio, assignors to Kaiser Aluminum & Chemical Corporation, Oakland, Calif., a corporation of Delaware
Filed Mar. 13, 1959, Ser. No. 799,315
4 Claims. (Cl. 29—547)

This invention relates to the production of wire. More particularly, this invention relates to the production of wire, e.g. aluminum and aluminum alloy wire, characterized by a bright smooth surface wherein undesirable surface materials are eliminated or substantially reduced. Such wire is eminently suited for various applications such as welding filler metal rod in consumable or non-consumable gas shielded arc welding.

This invention broadly comprises the steps of shaving wire stock followed by subjecting the shaved stock to a plurality of cold drawing operations and wherein the wire stock is annealed at least once subsequent to said shaving step. In the case of aluminum wire, annealing is carried out at a temperature of not more than 570° F. Upon completion of the drawing operations the wire is drawn through a cleaning die.

The accompanying drawing, which illustrates a presently preferred embodiment of an apparatus for carrying out this invention, is a side elevational view partly in cross section with parts removed for purposes of clarity shows an entry die, shaving die and exit die.

Referring now more particularly to the drawing, there is shown a shaving unit 1 comprising a housing 2 for mounting an entry die 3 and a second housing 4 for mounting a shaving die 5 and an exit die 6. Housing 2 is mounted on a suitable plate 7 by means of bolts and nuts 8, 9, and housing 4 is mounted on the plate by means of bolts 10. Plate 7 is reinforced by webs 11 and is pivotally mounted on a stand 12 by means of a pair of spaced plates 13 affixed to a plate 18, said plates 13 supporting the end portions of shaft 14 which passes through a suitable opening in block 15 which is affixed to plate 7. Suitable means such as cotter pins 16 are used to retain shaft 14 in proper position. The other end of plate 7 is supported by a bolt and nut assembly 17 adjustably provided thereon. The stand 12 comprises the plate 18 and angle iron legs 21. A rim 19 is bolted to plate 18 by means of bolts 20 thereby providing a pan to catch excess oil.

Housing 2 is provided with an open space 23 which serves as an oil reservoir. A cap member 25 is provided over the entry end of reservoir 23 and affixed to the housing 2 by means of bolts 26. Cap member 25 is provided with a round axial opening 33 of substantially the same diameter as the wire stock to be treated. Cutting oil enters the reservoir or space 23 through an opening 24 in the side thereof and a hose (not shown) attached at opening 24 and backs out through opening 33. While the oil is not under pressure, it enters reservoir 23 at a rate sufficiently fast to maintain reservoir 23 full. The cutting oil which leaks out through the opening 33 in the cap member 25 is caught in the pan formed by plate 18 and rim 19.

At the exit side of the reservoir 23 is provided a member 27 for mounting the entry die 3. Member 27 is maintained in position by means of a collar 29 and bolts 30. Entry die 3 is maintained in position by means of an internally threaded member 31 mounted on member 27 by engagement with external threads on member 27. By passing the rod or wire to be shaved through the reservoir 23 filled with cutting oil, the rod or wire is suitably lubricated.

The housing 4 is provided with an opening 34 which serves as a reservoir for cutting oil which is supplied under pressure through opening 35 by means of a suitable hose (not shown). It is preferred to supply the cutting oil at a pressure ranging from about 20 to 30 p.s.i. Shaving die 5 is mounted on one end of housing 4 within opening 34 and has tapered sides to match the taper of the opening 34. Shaving die 5 is maintained in position by means of an internally threaded member 36 mounted on the end of housing 4 by the engagement of the internal threads of member 36 with external threads on housing 4. The shaving die may employ any of several designs such as a conventional drawing die with the material passing through in the direction opposite that normally used for drawing. However, a design as shown in FIG. 1 for shaving die 5 is preferred. The cutting angle 32, i.e. the angle between the forward surface of the die 5 and a plane transverse to the wire stock generally will range from 0° to 37°, but it is preferred to employ approximately a 4° angle. It is also preferred to employ an inside angle 50, i.e. the angle between the rod and the inside of the die, of from 8° to 12°.

On the opposite end of housing 4 an exit die 6 is provided which fits within opening 34. Exit die 6 is maintained in position by means of a plate 39 and bolts 40. Plate 39 is provided with an opening 41 to permit passage of the shaved wire stock.

The cold drawing of the wire subsequent to shaving may be carried out in a conventional wire drawing apparatus. Since it is generally desirable to anneal the wire stock subsequent to passing through the shaving unit 1, a driven takeup reel may be provided on the exit end of shaving unit 1 to coil the wire stock subsequent to shaving.

In operation, the wire stock is first shaved, the stock being passed through cutting oil contained in reservoir 23 prior to shaving. In the case of aluminum or aluminum alloy wire, it is preferable that the wire stock be redraw rod. Also, it is preferred that the stock prior to shaving have a diameter at least .025″ larger than the shaved wire. The maximum differential between the shaved and unshaved wire is limited only by the practical problems of being able to shave without breaking the wire stock and the fact that it is uneconomical to shave the wire stock more than necessary since this results in a waste of material. The wire stock may be fabricated by conventional means well known to those skilled in the art, for example ⅜″ redraw rod may be fabricated by casting 12″ x 12″ ingots, homogenizing the ingots and then blooming the ingots to about 6⅜″ x 6⅜″. The blooms may then be sclaped and rolled to the desired rod size. Any conventional method for producing sound wire stock for drawing into wire is suitable. For example, the rod may be produced by extrusion or a rod of a diameter larger than desired could be fabricated by rolling, as described above, and subsequently drawn to the desired diameter.

It is essential for the shaving to be uniform around the circumference of the wire stock. Accordingly, the wire stock is maintained in alignment during the shaving step by passing the wire stock through an entry die 3 and an exit die 6 on either side of and in axial alignment with shaving die 5, the diameter of said wire stock being reduced by a small amount during passage through entry die 3 and exit die 6 to avoid any possibility of lateral movement of the wire passing through the shaving die. For example, where the wire stock employed is ⅜″ diameter the entry die may vary from about .310″ to .360″ diameter, the shaving die may vary from .304″ to .354″ diameter and the exit die may vary from .300″ to .350″ diameter. This range may vary in accordance with the size of the wire stock.

In a preferred embodiment of this invention, the wire stock passes through the shaving unit 1 at a rate of speed ranging from 450 feet per minute to 550 feet per minute.

Subsequent to shaving, the wire stock is subjected to a plurality of drawing operations in conventional drawing apparatus. However, it has been found that directly drawing the shaved wire tends to give galling. This problem is overcome by annealing the shaved wire. It is important in annealing to maintain the temperature below 570° F., preferably not over about 560° F. Temperatures above 570° F. tend to result in a very rapid, and undesirable oxide build-up on the wire while temperatures above about 560° F. tend to darken the wire.

In general, each cold drawing operation comprises passing the wire through a series of dies wherein the wire is wrapped several times around a driven capstan between each die. After passage through the last die of the series, the wire is coiled or spooled. In a drawing operation, the wire is generally drawn to the maximum reduction possible based on the drawability of the particular metal employed. The coiled or spooled wire may be annealed and subjected to another drawing operation where necessary in reaching final size. However, prior to further drawing the wire is annealed as described above.

It is preferred to employ carbide dies for all draws above .0625" diameter while for drawing wires below this diameter diamond dies are preferred. The soaking time for all the anneals depends upon the packaging or coiling of the wire. Where the wire is in the form of coils less time is required than where it is in the form of spools. The larger diameter wires, i.e. wires with a diameter greater than .200", are drawn on equipment which produces coiled wire and generally 30 to 40 minutes is required for the soaking period for such anneals. For small diameter wires, i.e. with a diameter less than .200", the wire is wound on metal spools. When spooled the wire does not heat through as quickly as when coiled and a period of 90 to 100 minutes is generally required for soaking.

The last die employed is a cleaning die. This die is generally employed in tandem with a drawing die, i.e. the wire passes directly from the last drawing die through the cleaning die without any form of intermediate coiling or wrapping. The cleaning die is a conventional drawing die which is lubricated with a suitable oil-solvent mixture, e.g., 50% Lubrite #7 and 50% Sinclair Solvent. The wire is submerged in the mixture during passage through the die. It is preferred that the cleaning die reduce the wire diameter in an amount ranging from about .002" to .004" as the wire passes through the die. The oil-solvent mixture used in the cleaning die helps to clean the wire as it is being drawn. Also, the low lubricity of the mixture causes it to be a poor lubricant and the wire is slightly burnished as it passes through the die. This burnishing effect helps to brighten the wire.

The drawn wire is degreased, e.g. by passing it through a suitable container (not shown) of trichlorethylene held at a temperature between 182° F. and 187° F. It is preferred to pass the wire through the container several times by the use of suitable means such as pulleys or sheaves whereby the wire passes through the trichlorethylene solution several times and through the vapor above the solution several times.

One example of the practice of this invention pertains to the treatment of an 1800 pound lot of ⅜" diameter 5183 aluminum alloy redraw rod to produce ¹⁄₁₆" diameter spooled welding wire. This rod was produced in a conventional manner well known to those skilled in the art and accordingly, the method will not be described in detail. Broadly, the method comprised casting 12" x 12" ingots which were homogenized and then bloomed to approximately 6⅜" by 6⅜". The blooms were scalped to 5¹⁵⁄₁₆" by 5¹⁵⁄₁₆" and then rolled to the ⅜" diameter rod. Analysis of the melt from which this lot of material was produced was as follows: .03% copper, .22% iron, .14% silicon, .56% manganese, 5.12% magnesium, .11% chromium, .03% titanium, balance substantially all aluminum and impurities in normal amounts. This ⅜" diameter rod was shaved by passing through a shaving unit having a .310" entry die, a .304" shaving die and a .300" exit die after which the material was coiled. The rate of travel of the material through the shaving die was 500 feet per minute. The coiled material was then annealed at 550° F. for ½ hour. The material was then drawn down to .210" diameter by conventional drawing apparatus and again coiled at a rate of 800 feet per minute. The coiled material was annealed at 550° F. for ½ hour. The annealed material was then drawn to .120" diameter and wound on metal spools at a rate of 1000 feet of wire per minute. The spools were annealed at 550° F. for 1½ hours. The annealed wire was then drawn to .0625" diameter at a rate of 1200 feet of wire per minute. The last die of the unit was a cleaning die wherein the wire was reduced .002". Prior to entering the cleaning die the wire was submerged in a mixture of 50% wire drawing oil and 50% solvent. The wire was then degreased by passing six times through trichlorethylene vapor and passing three times through trichlorethylene liquid wherein the solution was held at a temperature between 182° F. and 187° F. The degreased wire was then wound on spools.

Another example of the practice of this invention pertains to the treatment of an 1800 pound lot of ⅜" diameter 5356 aluminum alloy redraw rod to produce ³⁄₃₂" diameter spooled welding wire.

The redraw rod employed was produced in a conventional manner as described above in connection with the first example. Analysis of the melt from which this lot of material was produced was as follows: .01% copper, .16% iron, .10% silicon, .12% manganese, 4.85% magnesium, .01% zinc, .15% chromium, .06% titanium, balance substantially all aluminum and impurities in normal amount.

The ⅜" diameter rod was shaved by passing through a shaving unit having a .310" entry die, a .304" shaving die and a .300" exit die after which the material was coiled. The rate of travel of the wire stock through the shaving unit was 500 feet per minute. The coiled material was then annealed at 550° F. for ½ hour and the material was then drawn down to .210" diameter in a conventional drawing apparatus and again coiled at a rate of 800 feet of wire per minute. The coiled material was annealed at 550° F. for about ½ hour. The annealed material was then drawn to .0938" diameter in a conventional drawing apparatus at a rate of 1200 feet per minute. The last die of the unit was a cleaning die wherein the wire diameter was reduced .002". Prior to entering the cleaning die the wire was submerged in a mixture of 50% wire drawing oil and 50% solvent. The wire was then degreased by passing six times through trichlorethylene vapor and passing 3 times through trichlorethylene liquid wherein the solution was held at a temperature between 182° F. and 187° F. The degreased wire was then wound on spools.

Another example of the practice of this invention pertains to the treatment of an 1800 pound lot of ⅜" diameter 5183 aluminum alloy redraw rod to produce ³⁄₆₄" diameter spooled welding wire.

The redraw rod employed was produced in a conventional manner as described above in connection with the first example. This redraw rod had substantially the same composition as that of the first example.

The ⅜" diameter rod was shaved by passing through a shaving unit having a .360" entry die, a .354" shaving die and a .350" exit die, after which the material was coiled. The coiled material was then annealed at 550° F. for ½ hour and the material was then drawn down to .250" diameter by a conventional drawing apparatus and again coiled. The coiled material was annealed at 550° F. for about ½ hour. The annealed material was then drawn down to .172" diameter in a conventional drawing apparatus and coiled. The coiled material was annealed at 550° F. for ½ hour and the annealed material was then drawn to .095" diameter in a conventional drawing apparatus and wound on metal spools. The spools were annealed at 550° F. for 1½ hours. The annealed wire was then drawn to .0469" diameter. The last die in the unit was a cleaning die wherein the wire was reduced .002". Prior to entering the cleaning die the wire was submerged in a mixture of 50% wire drawing oil and 50% solvent. The wire was then degreased by passing 6 times through trichlorethylene vapor and passing three times through trichlorethylene liquid wherein the solution was held at a temperature between 182° and 187° F. The degreased wire was then wound on spools.

As used herein, the term "aluminum," is meant to cover high purity aluminum, commercial purity aluminum and aluminum alloys.

It will be understood that various changes, omissions and additions may be made to this invention without departing from the spirit and scope thereof as set forth in the appended claims.

What is claimed is:

1. A method of producing aluminum wire from approximately ⅜" diameter aluminum wire stock comprising the steps of shaving said wire stock by passing said stock through a shaving die having a diameter ranging from .304" to .354", maintaining said wire stock in alignment during shaving by passing said stock through an entry die having a diameter ranging from .310" to .360" axially aligned with said shaving die prior to passage through said shaving die, and passing said stock through an exit die having a diameter ranging from .300" to .350" axially aligned with said shaving die subsequent to passage through said shaving die, the diameter of said entry die being larger than the diameter of said shaving die, which, in turn, is larger than the diameter of said exit die, subjecting the shaved wire stock to a plurality of cold drawing operations, annealing said wire stock prior to each drawing operation at a temperature less than about 560° F., and for a time ranging from 30 to 100 minutes, all drawing operations being made at the maximum reduction possible, the final drawing operation being a reduction in area of at least 70%, submerging the wire in a mixture of 50% drawing oil and 50% solvent and drawing the wire through a cleaning die, upon completion of said drawing operations, reduction in said cleaning die being from .002" to .004", and degreasing said wire.

2. A method of producing aluminum wire from aluminum wire stock comprising the steps of
   reducing the diameter of said stock a small amount by passing said wire stock through an entry die,
   passing said stock through a shaving die having a diameter less than the diameter of said entry die,
   further reducing the diameter of said shaved wire stock by passing said shaved wire stock through an exit die having a diameter less than the diameter of said shaving die,
   said entry die and said exit die being axially aligned with said having die thereby maintaining said wire stock in alignment during said shaving step whereby said shaving is uniform around the circumference of said wire stock,
   subjecting the shaved wire stock to a plurality of cold drawing operations,
   annealing said wire at a temperature of less than 570° F. prior to each drawing operation,
   passing the wire through a cleaning die upon completion of the drawing operations and,
   degreasing said wire.

3. The method of claim 2 wherein said cleaning die reduces the diameter of said wire from 0.002" to 0.004".

4. The method of claim 2 wherein the time at the annealing temperature is from about 30 to 100 minutes.

References Cited in the file of this patent

UNITED STATES PATENTS

| | | |
|---|---|---|
| 2,174,907 | Waugh | Oct. 3, 1939 |
| 2,233,928 | Weaver | Mar. 4, 1941 |
| 2,679,680 | Hanks | June 1, 1954 |

OTHER REFERENCES

"The Aluminum Industry" volume II, by Edwards, Frary and Jeffries. McGraw-Hill Book Company, Incorporated, 370 Seventh Avenue, New York, N.Y., 1930. Page 350 relied on.

UNITED STATES PATENT OFFICE
CERTIFICATE OF CORRECTION

Patent No. 3,093,897                                June 18, 1963

Joseph R. Lemyre et al.

It is hereby certified that error appears in the above numbered patent requiring correction and that the said Letters Patent should read as corrected below.

Column 2, lines 50 and 51, for "sclaped" read -- scalped --; column 6, line 17, for "having" read -- shaving --.

Signed and sealed this 31st day of March 1964.

(SEAL)
Attest:
ERNEST W. SWIDER

Attesting Officer

EDWARD J. BRENNER

Commissioner of Patents